US 6,693,916 B1

(12) United States Patent
Chaplik et al.

(10) Patent No.: US 6,693,916 B1
(45) Date of Patent: Feb. 17, 2004

(54) METHOD AND SYSTEM FOR COMBINING SYMMETRIC DSL SIGNALS AND VOICE SIGNALS

(75) Inventors: Naom Chaplik, San Diego, CA (US); Seton P. Kasmir, San Diego, CA (US)

(73) Assignee: Viadux, Inc., San Diego, CA (US)

( * ) Notice: Subject to any disclaimer, the term of this patent is extended or adjusted under 35 U.S.C. 154(b) by 0 days.

(21) Appl. No.: 09/425,472

(22) Filed: Oct. 22, 1999

(51) Int. Cl.[7] .................................................. H04J 1/08
(52) U.S. Cl. ........................ 370/485; 370/493; 375/222
(58) Field of Search ................... 370/494, 493, 370/495, 488, 352, 485, 480, 481, 487, 490; 375/222

(56) References Cited

U.S. PATENT DOCUMENTS

| 5,757,803 | A | | 5/1998 | Russell et al. | |
| 6,069,899 | A | * | 5/2000 | Foley | 370/494 |
| 6,424,661 | B1 | * | 7/2002 | Bentley | 370/482 |

FOREIGN PATENT DOCUMENTS

EP 0917392 A2 5/1999
EP 0923221 A1 6/1999

* cited by examiner

*Primary Examiner*—Chau Nguyen
*Assistant Examiner*—Soon-Dong Hyun
(74) *Attorney, Agent, or Firm*—Gray Cary Ware & Freidenrich (57) ABSTRACT

This invention provides a simplified communication system that transmits voice and SDSL signals between customer premise equipment ("CPE") on a single twisted-pair line. The system preferably includes at least one combiner for combining voice and SDSL signals into a combined voice/SDSL signal that can be transmitted to the CPE on a single twisted pair of wires, preferably a pair of wires currently being used to transmit the voice signal to the CPE. One combiner is ideally located at a common wiring closet of the building where the CPE is located. The combiner is ideally coupled to the existing pair of wires for the voice signal. This eliminates the need to add another set of wires between the common wiring closet and the CPE for the SDSL signal. A second combiner, normally located at or near the CPE, separates the combined voice/SDSL signal into the separate voice and SDSL signals for processing by the CPE. The second and first combiners normally also combine and separate, respectively, the voice and SDSL signals transmitted from the CPE.

25 Claims, 3 Drawing Sheets

METHOD AND SYSTEM FOR COMBINING SYMMETRIC DSL SIGNALS AND VOICE SIGNALS

BACKGROUND OF THE INVENTION

1. Field of the Invention

This invention relates to generic Digital Subscriber Line systems and voice communications systems and more particularly to methods and systems for combining symmetric Digital Subscriber Line signals and analog voice signals.

2. Description of Related Art

With the increased usage of Internet services and the desire or need for other high data rate signals, consumers require equipment that can handle data signals at a rate greater than that available via traditional analog voice modems, which currently have a maximum data rate of 56K bits per second ("BPS"). Recently, business and residential consumers are using Digital Subscriber Line ("DSL") modems as part of a system for getting high speed access to the Internet. DSL type of service is currently being offered by many telecommunication access service providers, which include numerous independent access providers and traditional telephone companies. There are many variations of DSL including High-Bit-Rate Digital Subscriber Line ("HDSL"), Asymmetric DSL ("ADSL"), and Symmetric DSL ("SDSL"). ("Asymmetric" refers to the fact that the upload and download bit rates are not equal and "Symmetric" refers to the fact that the upload and download bit rates are the same.) HDSL and SDSL are both symmetrical DSL signals that use the same modulation technique. HDSL systems use two pairs of twisted wire, operate at a fixed data rate (equivalent rate to T1 in North America and E1 outside North America) and are mainly used as a replacement for T1 and E1 network connections. ADSL and SDSL systems use a single twisted pair of wires and are capable of operating at variable data rates. A description of an exemplary DSL system employing 2B1Q modulation is described in Bellcore TA-NWT-001210 Issue 1, Oct. 1991, Generic Requirements for High-Bit-Rate Digital Subscriber Lines which is hereby incorporated by reference for its teachings on DSL systems and 2B1Q modulation.

These DSL services are generically called xDSL. xDSL service reaches its customers by using copper wires that extend from a telephone company's Central Office ("CO") to a residence or business. Currently, telephone companies mostly offer ADSL service, which is a service targeted at their consumer or residential customer base and offer businesses T1 service using HDSL. Independent or alternative access providers are also in the access market and offer mostly SDSL. There are several types of SDSL and HDSL modems available. The most common type of modulation format the modems employ is a 2B1Q (two bits per quadrant or symbol) format, which is a simple four level signal modulation format known as Pulse Amplitude Modulation ("PAM"). For the sake of clarity, during the remainder of the document, only SDSL will be described although the invention applies equally to both SDSL systems and single wire pair HDSL systems that use 2B1Q modulation.

Figure 1:
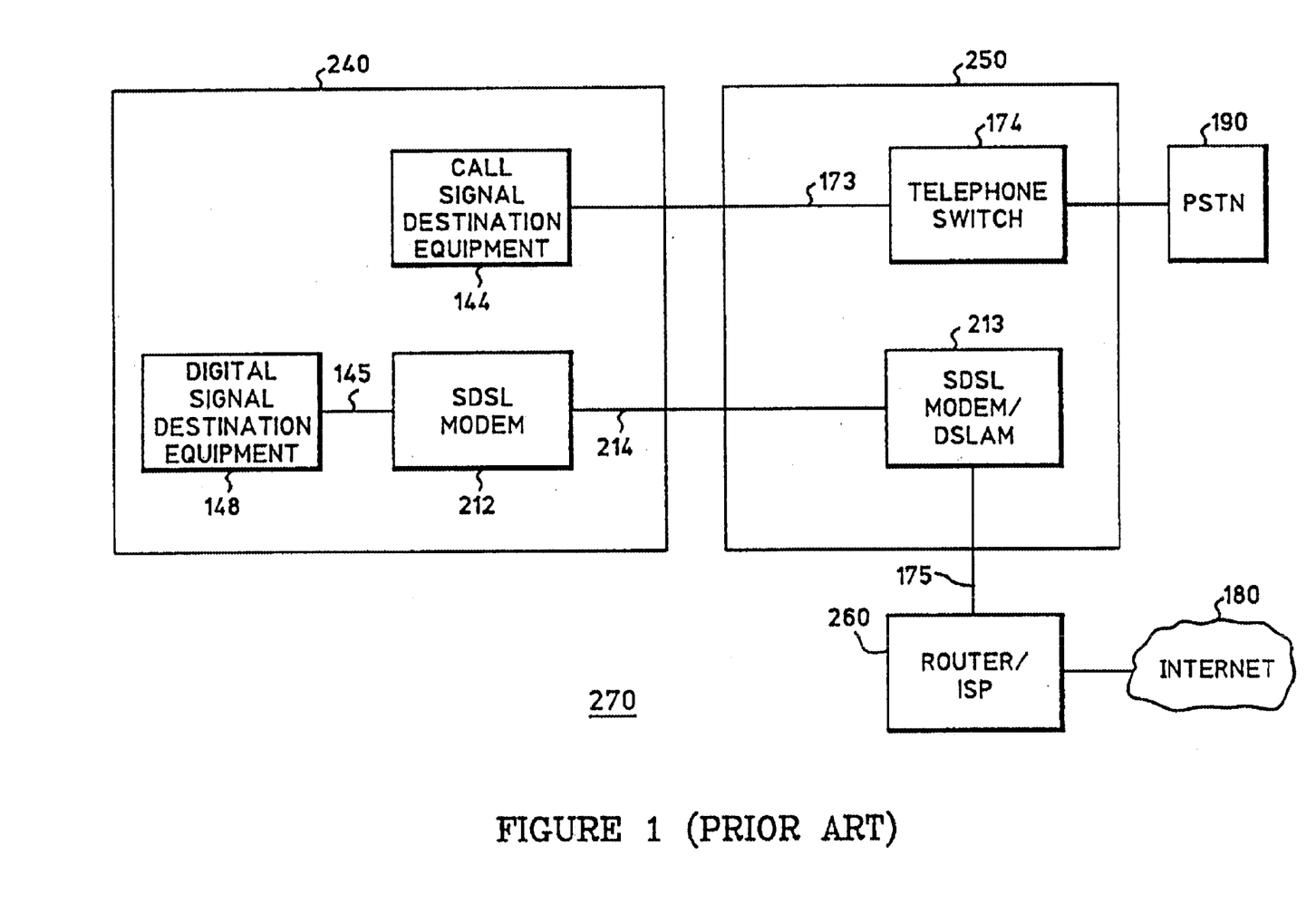
FIG. 1 is a prior art diagram of a communication system 270, in which the system provides an analog voice signal between customer premise equipment 240 and a central office 250 and provides an SDSL signal (using an SDSL service) between the customer premise equipment 240 and the central office 250.

FIG. 1 (Prior Art) is a diagram of a prior art communication system 270 in which both voice and data (via SDSL access) are delivered through independent means and equipment to an individual customer. Voice and SDSL is delivered in this way because of the inability of voice and such data signals to coexist on the same connection. As shown in this figure, Customer premise equipment ("CPE") 240 and Central Office ("CO") equipment 250 receive (a) traditional voice communication via a twisted pair of wires 173 and (b)SDSL communication via a separate twisted pair of wires 214 commonly dedicated to transferring only SDSL signals. The CPE 240 includes call signal destination equipment 144, an SDSL modem 212, and digital signal destination equipment 148. The CO equipment 250 includes a telephone switch 174 and an SDSL Modem and DSL Access Multiplexer ("DSLAM") 213. As shown in FIG. 1, the SDSL Modem/DSLAM 213 is coupled to the Internet 180 by a Router/Internet Service Provider ("ISP") 260, the connection thereto is known to one of skill in the art.

In this FIGURE, the central office ("CO") equipment 250 of a telephone company provides voice communication on the twisted pair of wires 173 between the call signal destination equipment 144 in the CPE 240 and a public switch telephone network ("PSTN") 190. The call signal destination equipment 144 may be any voice signal processing apparatus or telephone system such as a telephone keyset, public branch exchange ("PBX"), or voice band modem or fax. It is noted that the PSTN 190 may be any telephone system including PSTN, PBX, or plain old telephone system ("POTS"). As noted above, the CO equipment 250 includes a telephone switch 174 that transfers or switches analog voice signals to the twisted pair of wires 173 when the signal is addressed to the CPE 240 and to a connection into the public switched telephone network ("PSTN") 190. Voice and signaling signals appear on wires 173 and consist of voice band signals whose frequency ranges from zero to 3.4 kHz, a battery feed voltage (DC at −48 volts) and an AC ringing high voltage (20 Hz at 90 volts RMS). Transient signals may also appear on the twisted pair of wires 173 during changes in line conditions such as at the beginning and end of a ringing signal, the taking of a phone off-hook during ringing and not during ringing, the placement of a phone on-hook, the switching of ringing to battery feed signal and the switching of the battery feed signal to the ringing signal.

As also shown in this FIGURE, an SDSL access provider (either the telephone company or an alternative service provider) uses additional equipment, an SDSL Modem/DSLAM 213 inside the CO 260 for providing data communication on the twisted pair of wires 214 between the CPE 240 and the Internet 180 via a Router/ISP 260. The SDSL Modem/DSLAM 213 includes a digital subscriber line access multiplexer ("DSLAM") with SDSL modems.

The SDSL (2B1Q modulation format) modem inside the SDSL Modem/DSLAM 213 converts SDSL signals (which are modulated analog data signals) on the twisted pair of wires 214 to digital signals. The SDSL Modem/DSLAM 213 also multiplexes many SDSL modem signals into a single high-speed signal and passes that signal on to the ISP/Router 260. The ISP/ router 260 interconnects the SDSL Modem/DSLAM 213 to the Internet 180.

Similarly, when a digital data signal is transmitted from the Internet 180 to the CPE 240 via line 214, the ISP/router 260 transfers the Internet traffic to the SDSL Modem/DSLAM 213. Any digital data that is addressed to the CPE 240 is then sent to the appropriate SDSL modem of the SDSL Modem/DSLAM 213. The SDSL modem in the SDSL Modem/DSLAM 213 converts this digital data to an SDSL signal where the SDSL signal is modulated analog signal. The SDSL signal is transmitted to the CPE 240 via the twisted pair of wires 214. The SDSL (2B1Q) signals have a frequency range starting from DC (0 Hz) to an upper frequency that is one half of the assigned data rate. For example: when the data rate of the service being offered is 384 kbps, the frequencies generated are may range from 0 Hz to 192 kHz.).

As noted above, the CPE 240 includes an SDSL modem 212 and digital signal destination equipment 148. The SDSL modem 212 demodulates SDSL signals (as noted, the SDSL signals are analog data signals) received on the twisted pair of wires 214 and provides a digital signal that is transferred to the digital signal destination equipment 148 via line 145. Line 145 may be an Ethernet cable or serial cable capable of transferring a digital signal. The digital signal destination equipment 148 may be networking equipment such as a hub, router or switch or an individual computer. The SDSL modem 212 also modulates digital signals received from the digital signal destination equipment 148, using a modulation or encoding technique compatible with that used by the SDSL modem of SDSL Modem/DSLAM 213, and transmits them to the SDSL Modem/DSLAM 213 on the twisted pair of wires 214.

The twisted pairs of wires 173 and 214 are typically owned by the local telephone company and stretch between the CO and a demarcation point just inside a building, which is known as the Minimum Point of Entry ("MPOE"). The wiring (173 and 214) that connects between the MPOE and the CPE 240 is privately owned. In an office buildings that contains more than one tenant, the MPOE and the privately owned wiring is housed in a single wiring closet that is common for all tenants. Thus, when the CPE 240 is located in an office of a large building, the common wiring closet of the building may be located several hundreds of feet from the call signal destination equipment 144 and the SDSL modem 212. In many cases when the line 214 is being installed from the CO equipment 250, a consumer will not have the second twisted pair of wires 214 from the MPOE (or from the common wiring closet) to the CPE 240 and so will be required to install them.

In older buildings, adding additional sets of wires for each digital signal destination may be prohibitively costly and also time consuming, delaying the implementation of such high speed data access. SDSL communication systems, however, were not designed to operate with the telephone voice systems. SDSL signals and voice signals are incompatible and thus must use the separate wires 173 and 214 to transfer SDSL and voice signals from a CO to a building. One element of their incompatibility is that SDSL signals and voice signals overlap or interfere with each other (voice: 0 to 3.4 kHz and SDSL: 0 to hundreds of kHz). SDSL modems can not tolerate the voice signal mixed with its modem signal and humans can hear extremely low audio signal levels and thus also can not tolerate the SDSL signal. Another element is that SDSL modems do not contain algorithms for handling transient line conditions such as those outlined above. SDSL signals are modulated using a very simple modulation method and thus intolerant of interference and SDSL modems do not have any external filtering.

In contrast, ADSL communication systems and equipment were designed to share one set of twisted copper pair of wires from the CO to a building with an analog voice signal from a telephone company. The system characteristics of ADSL communication that allows it to coexist with voice signals include: 1) a large non-overlap or separation of signals between the maximum voice frequency (0 to 3.4 kHz) and the lowest ADSL frequency (22 kHz and above); 2) strong analog ADSL separation filters; 3) a complex ADSL modulation scheme; and 4) Digital Signal Processing ("DSP") algorithms that operate inside the ADSL modem to handle transient line conditions.

ADSL service has several disadvantages, however, for business use over SDSL service. In particular, ADSL signals are non-symmetrical; in other words the download signal rate is greater than the upload signal rate (from the CPE to ADSL service provider). The asymmetry is a disadvantage for commercial use because business customers typically need to move large blocks of data both to and from their establishment.

Consumers desiring the many advantages of SDSL service ideally would like to make use of their existing voice-signal wiring rather than having to install an additional line (part of line 214 of FIG. 1) between their CPE and a remote location in the same building (such as the MPOE or a wiring closet). Consequently, the need exists for a system and method that can combine SDSL signals with analog voice signals on a single twisted pair of wires without corrupting either signal even in the presence of voice and voice signaling signals.

SUMMARY OF THE INVENTION

The present invention includes a system for communicating a telephony voice signal and a SDSL signal on a single combined line where the frequency spectrum of the telephony voice signal during steady state conditions and the frequency spectrum of the SDSL signal may overlap. Further, the telephony voice signal may include a plurality of transients during non-steady state conditions, including transients that occur when a telephony device goes off-hook while a ring signal is present in the telephony voice signal. The SDSL signal ideally has a four level modulation format such as 2B1Q. The system includes a first voice and SDSL combiner and a second voice and SDSL combiner. In the preferred embodiment, the second combiner is ideally identical to the first combiner. Each combiner includes means for communicating the telephony voice signal and SDSL signal on the same single line without significantly corrupting or interrupting the SDSL signal and telephony voice signal even when transients are present on the telephony voice signal.

The first combiner is coupled to a telephone switch on a first voice line for communicating the telephony voice signal, to a first SDSL device on a first data line for communicating the SDSL signal, and to the single combined line for communicating a signal that is a combination of the telephony voice signal and the SDSL signal.

The second combiner is coupled to a telephony device on a second voice line for communicating the telephony voice signal, to a second SDSL device on a second data line for communicating the SDSL signal, and to the first combiner on the single combined line for communicating the signal that is a combination of the telephony voice signal and the SDSL signal.

In one embodiment the first (and also the second) combiner includes two signal processing means: a) a voice signal processing means that is coupled to a voice line and to the single combined line, and b) an SDSL signal processing means that is coupled to a data line and to the single combined line.

The voice signal processing means attenuates the frequency spectrum of the telephony voice signal from the voice line above a first predetermined cutoff frequency and attenuates the frequency spectrum of the signal sent to the voice line from the single combined line above the first predetermined cutoff frequency. These attenuations are ideally accomplished by means of a single low pass filter having a cutoff frequency higher than the upper frequency spectrum of the telephony voice signal during steady state conditions. The low pass filter also suppresses the effect of undesirable transients by means of a plurality of diodes coupled in parallel with each inductor of a plurality of inductors coupled closest to the voice line.

The SDSL signal processing means attenuates the frequency spectrum of the SDSL signal from the data line below a second predetermined cutoff frequency and attenuates the frequency spectrum of the signal sent to the data line from the single combined line below the second predetermined cutoff frequency. These attenuations are ideally accomplished by means of a single high pass filter, which ideally is a low order filter, having a cutoff frequency higher than that of the low pass filter in the voice signal processing means.

The present invention also includes a method for communicating a telephony voice signal and an SDSL signal on a single combined line where the frequency spectrum of the originating telephony voice signal during steady state conditions and the frequency spectrum of the originating SDSL signal may overlap. The originating telephony voice signal may also include a plurality of transients during non-steady state conditions.

The method includes communicating the telephony voice signal between a telephone switch on a first voice line and a telephony device on a second voice line via a single combined line. Also, the method includes communicating the SDSL signal between a first SDSL processing device on a first data line and a second SDSL processing device on a second data line via the same single combined line. The method includes communicating on the single combined line without significantly corrupting or interrupting the SDSL signal and the telephony voice signal even when transients are present on the telephony voice signal.

The method may attenuate the frequency spectrum of the signals between the first and second voice lines above a first predetermined cutoff frequency and attenuate the frequency spectrum of the signals between the first and second data lines below a second predetermined cutoff frequency that is higher than the first predetermined cutoff frequency.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 2:
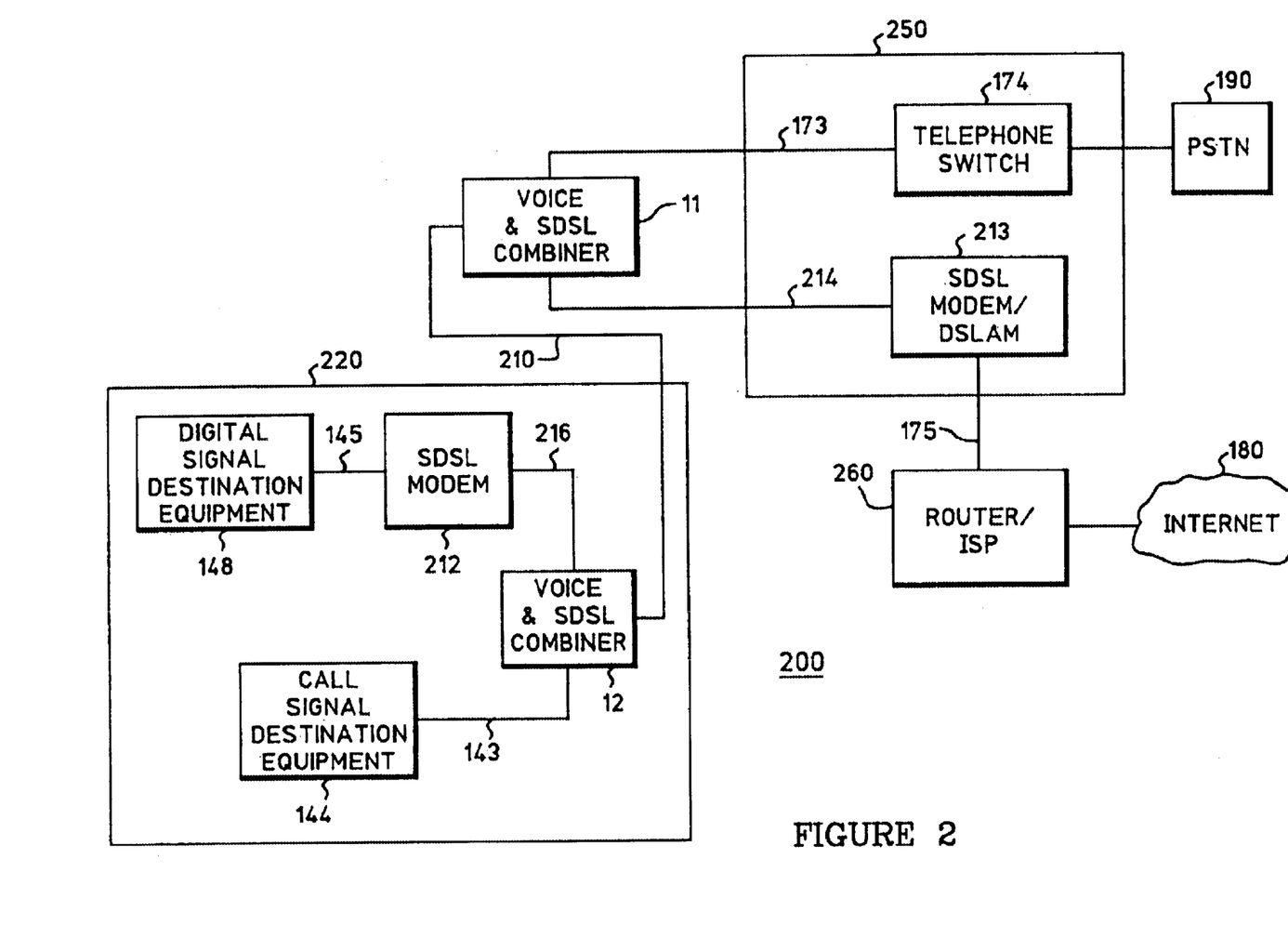
FIG. 2 is a diagram of an exemplary communication system 200 in accordance with the present invention, in which the system provides an analog voice signal on line 173 between a central office 250 and the building that contains the customer premise equipment 220 and provides an SDSL signal (using an SDSL service) on line 214 between the central office 250 and the building that contains the customer premise equipment 220 and in which the analog voice signal and the SDSL signal are combined at a first voice and SDSL combiner 11 located in or near the building that contains the CPE 220 therefore allowing the consumer to use only one twisted-pair line between their CPE 220 and the location of the combiner 11.

FIG. 2 is a diagram of an improved system 200 for transmitting an analog voice signal between customer premise equipment ("CPE") 220 and a central office 250 of a telephone service provider, and an SDSL signal between the CPE 220 and an SDSL service provider equipment 213 located in the central office 250 according to the present invention. The analog voice signal on line 173 and the SDSL signal on line 214 are combined and separated by the first and second voice and SDSL combiners 11 and 12, as described below.

The system 200 shown in FIG. 2 includes equipment known to those skilled in the art and which operate as already described in FIG. 1, as follows: the PSTN 190, the central office 250, the analog voice twisted pair of wires 173, the call signal destination equipment 144, the Internet 180, the Router/ISP 260, the SDSL twisted pair of wires 214, the SDSL modem 212, the digital signal destination equipment 148, and line 145 coupling the modem 212 to the equipment 148.

The preferred embodiment 200 also includes a first voice and SDSL combiner 11, ideally situated at a location (which may be a common wiring closet) in or near the building that contains the CPE 220, near the existing voice signal wires 173 and 210, and near where the twisted pair of wires 214 supplied by the SDSL service provider terminate, such that additional wiring is minimized. The first voice and SDSL combiner 11 is coupled to the telephone switch 174 of the CO 250 via the analog voice line 173 and to the SDSL Modem/DSLAM 213 of the CO 250 via analog data line 214. The first voice and SDSL combiner 11 combines the analog voice signal on line 173 with the SDSL signal on line 214 to generate a combined voice/SDSL signal on line 210.

A second voice and SDSL combiner 12, ideally identical to the first voice and SDSL combiner 11 and ideally located relatively close to the other equipment of the customer as part of the CPE 220, receives the combined voice/SDSL signal on line 210 and separates the signal into an analog voice signal on line 143 and an SDSL signal on line 216. The second voice and SDSL combiner 12, also combines the analog voice signal on line 143 and the SDSL signal on line 216 into the combined voice/SDSL signal on line 210.

As described below, in the exemplary embodiment the analog voice signal on line 143 is substantially the same as the analog voice signal received on line 173. Likewise, the SDSL signal on line 216 is substantially the same as the SDSL signal received on line 214, except for possible attenuation of a baseband segment (baseband or DC to a predetermined frequency) of the frequency spectrum of the SDSL signal. However, the SDSL modem 212 processes the signal using essentially the full frequency spectrum, which results in acceptable or manageable signal errors. More critically, the combiner 11 in conjunction with combiner 12 prevents or eliminates the corruption or further attenuation of the SDSL signal even when it is combined with a voice signal during voice signal transients, while not including or requiring complex DSP circuitry as in prior art systems including ADSL systems. Although the above description explains how the voice and SDSL combiners 11 and 12 process signals traveling toward the CPE 220, it should be understood that the combiners, being ideally identical, also process signals traveling away from the CPE 220 in essentially the same way.

As noted in the background of the invention, one of the limitations of prior art voice/data communication systems was that an additional pair of wires may need to be installed between some location (such as a common wiring closet as described above) and the customer prenise equipment (CPE). By placing combiners 11 and 12 as described above, an existing twisted pair of wires 210 that is currently being used to transmit only analog voice signals may be used to transmit both analog voice signals and SDSL signals. This resolves limitations of the prior art systems by saving the time and cost of installing additional twisted pairs of wires for each SDSL signal being transmitted from one location in a building to a CPE elsewhere in the building where the CPE already has a twisted pair of wires connected to the location for analog voice transmissions.

Figure 3:
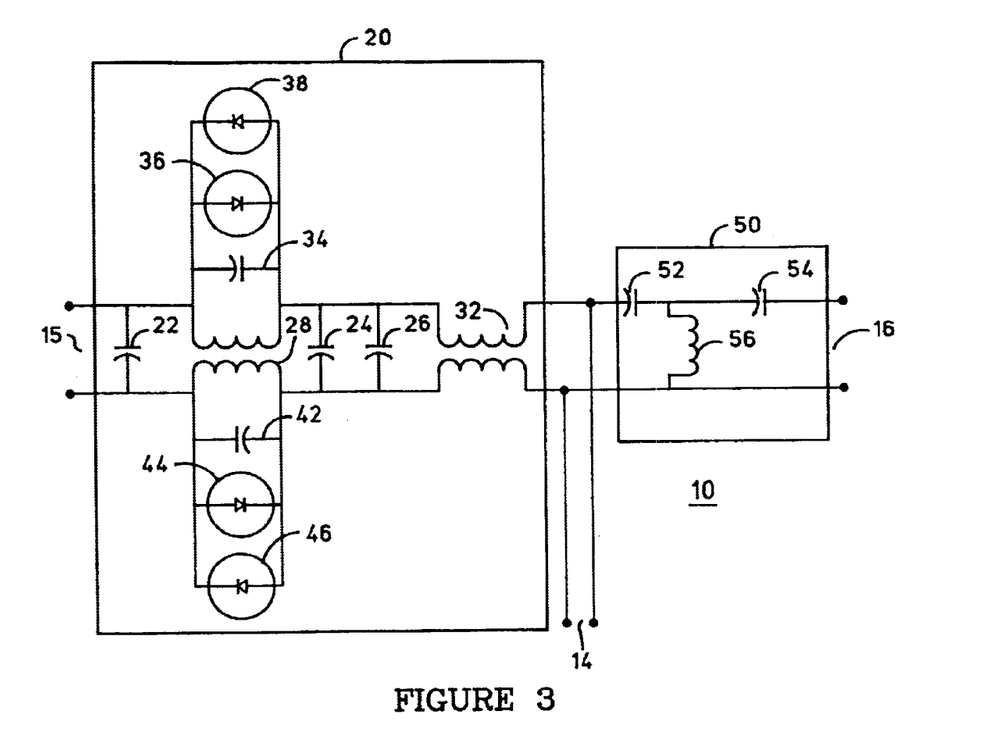
FIG. 3 is a block diagram of an exemplary voice and SDSL combiner 10 in accordance with the present invention, in which the device combines and separates analog voice signals and SDSL signals as required in the systems depicted in FIGS. 2 and 4.

FIG. 3 presents an exemplary voice and SDSL combiner 10 suitable for use as the first and second voice and SDSL combiners 11 and 12. As shown in FIG. 3, the combiner 10 includes a voice signal filtering section 20, a SDSL signal filtering section 50, a voice signal two-wire line or port 15, a combined voice/SDSL signal two-wire line or port 14, and a SDSL signal two-wire line or port 16. In summary, combined analog voice/SDSL signals that are received at port 14 are processed by the voice signal filtering section 20 and by the SDSL signal filtering section 50. In addition, voice signals that are received at port 15 and SDSL signals that are received at port 16 are processed by sections 20 and 50 respectively to provide a combined analog voice/SDSL signal at port 14.

The voice signal filtering section 20 provides voice signals on line 15 by filtering or extracting voice signals from the combined voice/SDSL signals on line 14. The voice signal filtering section 20 also filters voice signals from line 15 to allow them to be combined with the SDSL signal, and includes circuitry that prevents voice signal transients from affecting or noticeably corrupting the SDSL signal.

The SDSL signal filtering section 50 provides SDSL signals on line 16 by filtering or extracting SDSL signals from the combined voice/SDSL signals on line 14. The SDSL signal filtering section 50 also filters SDSL signals from line 16 to allow them to be combined with the voice signal. The SDSL signal filtering section 50 does not impact the voice signal or impact SDSL modems coupled to the voice and SDSL combiner 10.

In order to effectively separate voice signals and SDSL signals from combined voice/SDSL signals received on line 14, the combiner 10 should not cause detectable distortion to either signal and also not impact devices that are commonly connected to the combiner 10 as noted. For example, as shown in FIG. 2, an SDSL modem may be connected to the port 16 for receiving SDSL signals generated by the combiner 10 from combined voice/SDSL signals received on line 14. In order to effectively separate these signals and not impact devices commonly connected to combiner 10, the possible signals on line 14 should be considered, in particular transients in the voice signal.

During steady state as noted above, the voice signal occupies a frequency band of zero to 3.4 KHz. During a call setup or completion, transients may be generated in the analog voice signal. Such transients include ringing, generation of pulse tones, and taking a phone off-hook during ringing or non-ringing. The SDSL signal may have a frequency spectrum that extends from baseband or DC to a predetermined upper limit frequency as a function of the encoding technique used in the SDSL modems and the data rate of the SDSL signal. In the preferred embodiment, a lower section or baseband section of the frequency spectrum of the SDSL signal is attenuated in order to enable the voice signal to be combined with the attenuated SDSL signal during steady state of the voice signal. This design criterion (the attenuation of a baseband section of the SDSL signal) is made known to the SDSL service provider and customer. As noted, the design criterion does not introduce significant errors in the SDSL modem or resultant digital data.

Accordingly, given the known upper frequency of the frequency spectrum of the analog voice signal during steady state, the combiner 10 ideally filters the combined voice/SDSL signal to extract the voice signal using a low pass filter having a cutoff frequency substantially higher than the upper voice frequency. This reduces possible distortion of the voice signal due to the filter. Further, the combiner 10 ideally filters the combined voice/SDSL signal to extract the SDSL signal using a high pass filter having a cutoff frequency greater than that of the low pass filter that is used for the voice signal. This selection of the cutoffs for the low pass filter and high pass filter helps prevent spectrum leakage from affecting the voice and SDSL signals during filtering.

As noted above, a key concern or problem with combining analog voice signals and SDSL signals is the possible corruption of the SDSL signal during voice signal transients. An SDSL modem receiving an SDSL signal with such corruption may not be able to extract any data information in the signal because the modem does not include DSP algorithms designed to compensate for signal corruption. As noted above, the possible analog voice signal transients include 1) the introduction of a ring voltage in the voice signal; 2) the DC voltage/current of the voice signal; 3) the introduction of dial tones or pulses in the voice signal; 4) the change in DC voltage/current of the voice signal when a telephone device coupled to the voice line goes off-hook (shorting the line); and 5) the change in ring voltage present on the voice signal when a telephone device coupled to the voice line goes off-hook (shorting the line) during the presence of the ring voltage (during ringing). The combiner 10 ideally should be able to prevent any of these signals from disturbing or influencing the SDSL signal in such a manner as to disrupt the SDSL modem's demodulation process (act of receiving and correctly decoding the information within the SDSL signal) and thus prevent producing errors in the resultant digital data stream. In particular, the combiner 10 should be able to provide undistorted SDSL signals on line 16 even when voice signal transients are present. The circuitry of the combiner 10 and the mechanics thereof that suppresses the effects of voice signal transients on the SDSL signal are presented below.

It is also noted that the high pass filter for the SDSL signals should not add significant or greatly variable group delay to the SDSL signal. As noted above, an SDSL modem is coupled to line 16 of combiner 10. These modems include equalization circuitry that attempts to equalize delays caused by the transmission of the SDSL signal from one SDSL modem to another. The introduction of group delay by the high pass filter may place an additional burden on the equalization circuitry of these modems. The group delay may introduce data errors when the equalization circuitry is not able to fully compensate for the group delay introduced by the filter. Accordingly, the high pass filter should be designed so the filter does not introduce unequalizable group delays.

It is further noted that, because the low pass filter and high pass filter are commonly coupled to the same line, the impedance of one filter may be projected onto the other filter. In prior art combiners (such as ADSL splitters), the impedance to high frequency signals, as presented by the low pass filter, may distort the higher frequency signals of the SDSL signal. The voice signal filter section 20 uses a low pass filter that overcomes the limitations of the prior art, and the SDSL signal filter section 50 uses a high pass filter that overcomes the limitations of the prior art.

Regarding the voice signal filtering section 20, the cutoff of its low pass filter ("LPF") should be much higher than the upper frequency spectrum of the voice signal during steady state. In the preferred embodiment of the invention, the cutoff is at least twice as great as the 3.4 KHz upper range of the standard telephony voice signal, i.e.; it is greater than 6.8 KHz, and ideally in the range of 7.5 KHz to 8.0 KHz. The selection of this cutoff for the LPF of the voice signal filtering section 20 reduces the impact of the filtering section 20 on voice signals. As shown in FIG. 3, the voice signal filtering section 20 includes a plurality of capacitors 22, 24, 26, 34, and 42, two transformers acting as inductors 28 and 32, and a plurality of diodes 36, 38, 44, and 46.

When capacitors 22, 24, 26, 34, and 42 have a nominal capacitance of 22 NF, 33 NF, 6.8 NF, 10 NF, and 10 NF, respectively, and transformers 28 and 32 have an effective nominal inductance of 76 MH and 64 MH, respectively, the LPF has a frequency response as shown in TABLE 1, which lists the attenuation of the filter in dB as a function of frequency. Viewing TABLE 1, it can be seen that the cutoff of the LPF of the voice filtering section 20 is about 7.5 KHz, as desired.

TABLE 1

| LOW PASS FILTER RESPONSE | | HIGH PASS FILTER RESPONSE | |
|---|---|---|---|
| Hz | dB | kHz | dB |
| 300 | −0.019 | 2 | 87.496 |
| 500 | −0.014 | 4 | 63.556 |
| 700 | −0.005 | 6 | 49.694 |
| 900 | 0.006 | 8 | 39.991 |
| 1100 | 0.020 | 10 | 32.581 |
| 1300 | 0.038 | 12 | 26.628 |
| 1500 | 0.058 | 14 | 21.684 |
| 1700 | 0.082 | 16 | 17.490 |
| 1900 | 0.108 | 18 | 13.894 |
| 2100 | 0.138 | 20 | 10.811 |
| 2300 | 0.170 | 22 | 8.203 |
| 2500 | 0.205 | 24 | 6.055 |
| 2700 | 0.242 | 26 | 4.351 |
| 2900 | 0.280 | 28 | 3.059 |
| 3100 | 0.321 | 30 | 2.119 |
| 3300 | 0.362 | 32 | 1.458 |
| 3500 | 0.403 | 34 | 1.003 |
| 3700 | 0.474 | 36 | 0.694 |
| 3900 | 0.484 | 38 | 0.484 |
| 4100 | 0.523 | 40 | 0.341 |
| 4300 | 0.559 | 42 | 0.243 |
| 4500 | 0.593 | 44 | 0.175 |
| 4700 | 0.625 | 46 | 0.128 |
| 4900 | 0.656 | 48 | 0.094 |
| 5100 | 0.688 | 50 | 0.070 |
| 5300 | 0.724 | 52 | 0.052 |
| 5500 | 0.772 | 54 | 0.040 |
| 5700 | 0.839 | 56 | 0.030 |
| 5900 | 0.940 | 58 | 0.023 |

TABLE 1-continued

| LOW PASS FILTER RESPONSE | | HIGH PASS FILTER RESPONSE | |
|---|---|---|---|
| Hz | dB | kHz | dB |
| 6100 | 1.094 | 60 | 0.018 |
| 6300 | 1.327 | 62 | 0.013 |
| 6500 | 1.669 | 64 | 0.010 |
| 6700 | 2.153 | 66 | 0.008 |
| 6900 | 2.805 | 68 | 0.006 |
| 7100 | 3.644 | 70 | 0.004 |
| 7300 | 4.672 | 72 | 0.003 |
| 7500 | 5.877 | 74 | 0.002 |
| 7700 | 7.237 | 76 | 0.001 |
| 7900 | 8.729 | 78 | 0.001 |
| 8100 | 10.334 | 80 | 0.000 |
| 8300 | 12.041 | 82 | −0.001 |
| 8500 | 13.847 | 84 | −0.001 |
| 8700 | 15.762 | 86 | −0.001 |
| 8900 | 17.806 | 88 | −0.002 |
| 9100 | 20.021 | 90 | −0.002 |
| 9300 | 22.473 | 92 | −0.603 |
| 9500 | 25.277 | 94 | −0.003 |
| 9700 | 28.661 | 96 | −0.003 |
| 9900 | 33.151 | 98 | −0.003 |
| 10100 | 40.555 | 100 | −0.004 |

As noted above, there may be many different types of signals present on line 14, in particular the voice signal transients as described above, that the combiner 10 should ideally handle without causing interference to other signals present on the line 14. Transient signals generated by telephony voice signals may introduce significant handling problems. Of the possible transients that may occur in a telephony voice signal, compensating for a telephone device going off-hook (producing a short on port 15) while a ring voltage is present on line 14 is particularly important. For example, the telephone switch 22 of FIG. 4 may produce a ringing signal while the analog voice device 26 goes off-hook. This produces a transient in the voice signal that exists between the telephone switch 22 and the analog voice device 26 of FIG. 4.

Figure 4:
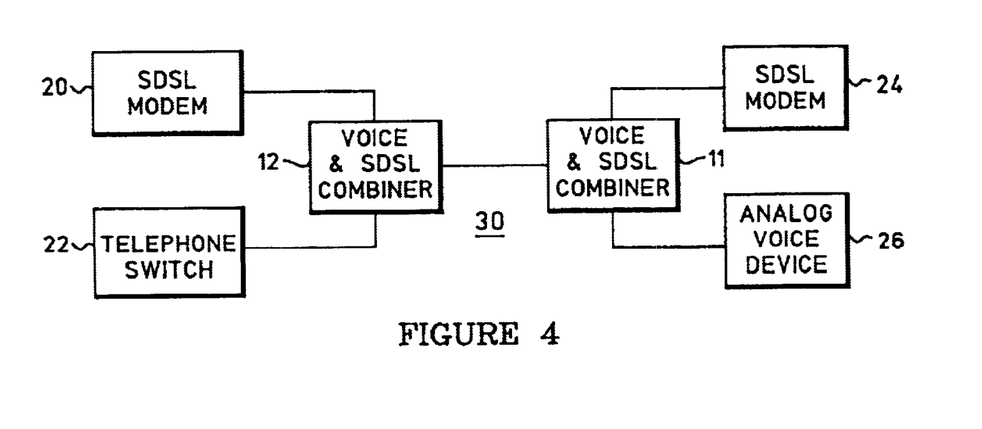
FIG. 4 is a diagram of a simplified communication system 30 that includes a system for combining a voice signal and an SDSL signal on a single combined line in accordance with the present invention.

The two combiners 11 and 12 should be able to suppress the transients so that an SDSL signal between the SDSL modems 1 and 24 of FIG. 4 is not affected. During this kind of transient the transformers 28 and 32 (acting as inductors) of each combiner 11 and 12 may produce a large spike of voltage up to 300 volts due to the presence of the ringing signal. The filters present in the combiners 11 and 12 are designed to process steady state signals, so such a voltage spike would not be significantly attenuated by the filters and thus would corrupt the SDSL signal between the SDSL modems 1 and 24. Such an interruption may disrupt the operation of the SDSL modems whereby the modems lose synchronization and where the lost of synchronization between the modem may lead to substantial data loss.

In order to reduce or prevent the first transformer 28 of each combiner 11 and 12 from producing such a spike during this transient, the preferred embodiment 10 includes the plurality of diodes 36, 38, 44, and 46. Diodes 36 and 38 are placed in parallel with one winding of the transformer 28 and diodes 44 and 46 are placed in parallel with the other winding of the transformer 28. When the above referenced transient occurs (when an open line occurs on line 15 while a ring voltage is present on line 14) the diodes 36, 38, 44, and 46 prevent the transformer 28 from generating a spike of voltage that may feed back to lines 14 and 16. Thus, these diodes help prevent possible corruption or interruption of SDSL signals present on lines 14 and 16 due to this transient in the voice signal. The transformer 32 is less likely to introduce or produce a voltage spike when such a transient occurs because capacitors 24 and 26 buffer such a transient before it reaches the transformer 32.

As noted above, combiner 10 ideally should also not burden the equalization process of an SDSL modem coupled to line 16. The SDSL signal filtering section 50 includes a high pass filter ("HPF"). The HPF reduces voice signals received from line 14 so that primarily only SDSL signals from line 14 are transmitted to line 16. Filters introduce group delay to signals as they pass through. The presence of a complex filter may add variable group delay that is not easily equalized, increasing the complexity or burden of associated modems. The HPF of the preferred SDSL signal filtering section 50 has a relatively short group delay and, in addition, the difference between the minimum group delay introduced by the HPF and the maximum group delay introduced by the HPF is small. This reduces the complexity of associated modems because the delay introduced by the combiner 10 is relatively constant and small.

In the preferred embodiment 10, the data filtering section 50 includes two capacitors 52 and 54 and an inductor 56. The two capacitors 52 and 54 and the inductor 56 are configured as shown in FIG. 4 to form an HPF that filters or reduces the presence of signals having a frequency spectrum lower than the cutoff of the filter. When capacitors 52 and 54 have a nominal capacitance of 33 NF, and inductor 56 has a nominal inductance of 0.390 MH, the HPF filter of the data filtering section 50 has a frequency response as shown in TABLE 1, which lists the attenuation of the filter in dB as a function of frequency. Viewing TABLE 1, it can be seen that the cutoff of the HPF of the data filtering section 50 is about 24 KHz. It is noted that this cutoff frequency may affect SDSL signals on line 14 in some embodiments, in particular for a portion of the baseband spectrum below the cutoff of this filter and of the low pass filter as described above. This cutoff is selected, however, to reduce interference between the voice signal filtering section 20 and the SDSL signal filtering section 50.

As noted above, the cutoffs of the LPF and HPF of sections 20 and 50 are ideally separated to reduce interference between the filters. As noted above each filter also generates signal impedance at the input of the other filter. For example, the LPF of section 20 generates signal impedance at the input of the HPF of section 50. Thus, if the LPF of section 20 presents low shunt impedance to line 14 at high frequencies it may suppress or reduce the high frequency signals present in SDSL signals on line 14. An LPF commonly terminates with a capacitor that may present low shunt impedance at the input of a parallel HPF. However, as shown in FIG. 3, in the preferred embodiment 10, the LPF of the voice signal filtering section 20 terminates with an inductor (transformer 32 acting as an inductor). The transformer 32 has greater impedance as the frequencies increase and thus is less likely to short SDSL signals on line 14. Thus, it can be seen that the combiner 10 may be used to separate combined analog voice and SDSL signals while not causing significant distortion of either signal, even when transients occur in the voice signal.

It is noted that other HPF and LPF configurations may be used in the combiner 10 where the filters have similar characteristics but not necessarily the same cutoff frequencies. Accordingly, it is to be understood that the invention is not to be limited by the specific illustrated embodiment, but only by the scope of the appended claims.

What is claimed is:

1. A system for communicating a telephony voice signal and an SDSL signal on a single combined line where the frequency spectrum of the telephony voice signal during steady state conditions and the frequency spectrum of the SDSL signal may overlap, and where the telephony voice signal may include a plurality of transients during non-steady state conditions, the system including:

a first combiner coupled to a telephone switch on a first voice line for communicating the telephony voice signal, and to a first SDSL device on a first data line for communicating the SDSL signal, the first combiner configured to communicate both the telephony voice signal and the SDSL signal on the single combined line without significant interference even when transients are present on the telephony voice signal and where the first SDSL device may be disrupted when such transients exist on the first data line; and a second combiner coupled to a telephony device on a second voice line for communicating the telephony voice signal, to a second SDSL device on a second data line for communicating the SDSL signal, and to the first combiner via the single combined line for communicating both the telephony voice signal and the SDSL signal, the second combiner configured to communicate the telephony voice signal and the SDSL signal on the single combined line without significant interference even when transients are present on the telephony voice signal and where the second SDSL device may be disrupted when such transients exist on the second data line.

2. The system according to claim 1 wherein each of the first and the second combiner includes:

a voice signal processor coupled to the voice line of the combiner, and to the single combined line, configured to attenuate the frequency spectrum of the telephony voice signal from the voice line above a first predetermined cutoff frequency and attenuate the frequency spectrum of the combined voice and SDSL signal to the voice line above the first predetermined cutoff frequency; and an SDSL signal processor coupled to the data line of the combiner, and to the single combined line, configured to attenuate the frequency spectrum of the combined voice and SDSL signal to the data line below a second predetermined cutoff frequency and attenuate the frequency spectrum of the SDSL signal from the data line below the second predetermined cutoff frequency.

3. The system according to claim 1, wherein the plurality of transients that may occur on the telephony voice signal includes the telephony device coupled to the second voice line going off-hook.

4. The system according to claim 2, wherein the plurality of transients that may occur on the telephony voice signal includes the telephony device coupled to the second voice line going off-hook.

5. The system according to claim 1, wherein the first combiner is substantially the same as the second combiner.

6. The system according to claim 2, wherein the voice signal processor includes a low pass filter having a cutoff frequency higher than the upper frequency spectrum of the telephony voice signal during steady state conditions.

7. The system according to claim 6, wherein the SDSL signal processor includes a high pass filter having a cutoff frequency higher than the upper frequency spectrum of the telephony voice signal during steady state conditions.

8. The system according to claim 7, wherein the high pass filter is a low order filter.

9. The system according to claim 8, wherein the high pass filter is formed of an inductor in parallel with the line, and two capacitors in series with the line.

10. The system according to claim 6, wherein the SDSL signal processor includes a high pass filter having a cutoff frequency higher than the upper frequency spectrum of the telephony voice signal during steady state conditions and higher than the cutoff frequency of the low pass filter.

11. The system according to claim 10, wherein the high pass filter and the low pass filter are both coupled to the single combined line.

12. The system according to claim 10, wherein the low pass filter includes a plurality of capacitors and a plurality of inductors and only one or more of the inductors of the low pass filter are coupled to the single combined line.

13. The system according to claim 12, wherein each of one or more inductors of the plurality of inductors of the low pass filter coupled closest to the voice line is coupled in parallel with a plurality of diodes.

14. The system according to claim 1, wherein the SDSL signal is modulated using a four level format.

15. The system according to claim 1, wherein the SDSL signal is modulated using a 2B1Q format.

16. The system according to claim 1, wherein the plurality of transients that may occur on the telephony voice signal includes the telephony device coupled to the second voice line going off-hook while a ring signal is present in the telephony voice signal.

17. A method for communicating a telephony voice signal and an SDSL signal on a single combined line where the frequency spectrum of the telephony voice signal during steady state conditions and the frequency spectrum of the SDSL signal may overlap, and where the telephony voice signal may include a plurality of transients during non-steady state conditions, the method comprising:

communicating the telephony voice signal on a first voice line between a telephone switch via the single combined line;

communicating the SDSL signal on a first data line between a first SDSL device via the single combined line without significantly corrupting or interrupting the SDSL signal and telephony voice signal even when transients are present on the telephony voice signal and where the first SDSL device may disrupted when said transients are present on the first data line;

communicating the telephony voice signal on a second voice line between a telephony device via the single combined line; and communicating the SDSL signal on a second data line between a second SDSL device via the single combined line without significantly corrupting or interrupting the SDSL signal and telephony voice signal even when transients are present on the telephony voice signal and where the second SDSL device may disrupted when said transients are present on the second data line.

18. The method according to claim 17, wherein communicating the telephony voice signal on a first voice line and communicating the telephony voice signal on a second voice line include attenuating the frequency spectrum of the telephony voice signal from the associated voice line above a first predetermined cutoff frequency and attenuating the frequency spectrum of the SDSL signal to said voice line above the first predetermined cutoff frequency, and wherein communicating the SDSL signal on a first data line and communicating the SDSL signal on a second data line include attenuating the frequency spectrum of the telephony voice signal to the associated data line below a second predetermined cutoff frequency and attenuating the frequency spectrum of the SDSL signal from said data line below the second predetermined cutoff frequency.

19. The method according to claim 17, wherein the plurality of transients that may occur on the telephony voice signal includes the telephony device coupled to the second voice line going off-hook.

20. The method according to claim 17, wherein the SDSL signal is modulated using a four level format.

21. The method according to claim 17, wherein the SDSL signal is modulated using a 2B1Q format.

22. The method according to claim 18, wherein the plurality of transients that may occur on the telephony voice signal include the telephony device coupled to the second voice line going off-hook while a ring signal is present in the telephony voice signal.

23. The method according to claim 18, wherein the attenuation of the telephony voice signal includes the suppression of transients that are of a higher voltage than that of the telephony voice signal during steady state conditions.

24. The method according to claim 18, wherein the method of attenuating the telephony voice signal has a minimum effect on the SDSL signal.

25. The method according to claim 18, wherein the method of attenuating the SDSL signal is a low order attenuation method.

* * * * *